US012650875B2

(12) United States Patent
Karmarkar

(10) Patent No.: US 12,650,875 B2
(45) Date of Patent: Jun. 9, 2026

(54) CONTROLLING VIRTUAL MACHINE PORTING ACTIVITY BASED ON DYNAMICALLY-CALCULATED VIRTUAL MACHINE PREDICATE VALUES IN MATCH EXPRESSIONS

(71) Applicant: Nutanix, Inc., San Jose, CA (US)

(72) Inventor: Amol Avinash Karmarkar, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 423 days.

(21) Appl. No.: 18/375,312

(22) Filed: Sep. 29, 2023

(65) Prior Publication Data

US 2025/0068448 A1     Feb. 27, 2025

Related U.S. Application Data

(60) Provisional application No. 63/534,643, filed on Aug. 25, 2023.

(51) Int. Cl.
G06F 9/455          (2018.01)

(52) U.S. Cl.
CPC .. G06F 9/45558 (2013.01); *G06F 2009/4557* (2013.01); *G06F 2009/45579* (2013.01)

(58) Field of Classification Search
CPC ......... G06F 9/45558; G06F 2009/4557; G06F 2009/45579
See application file for complete search history.

(56) References Cited

U.S. PATENT DOCUMENTS 8,549,518 B1    10/2013  Aron et al.
8,601,473 B1    12/2013  Aron et al.
8,850,130 B1     9/2014  Aron et al.
9,772,866 B1     9/2017  Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Gregory A Kessler
(74) *Attorney, Agent, or Firm* — Vista IP Law Group, LLP

(57) ABSTRACT

Computer-implemented techniques for controlling virtual machine (VM) porting activities based on dynamically-calculated virtual machine predicate values. Upon receiving a command to port a subject virtual machine from a source virtualization system environment to a target virtualization system environment (wherein the source virtualization system environment and the target virtualization system environment are different), one or more match expressions that describe time of day and resource predicates conditions, under which porting operations of the subject virtual machine are to be carried out are evaluated. Based on observance of the aforementioned time of day and resource predicates, various virtual machine porting operations are either carried out (e.g., when applicable match expressions and/or predicates evaluate to TRUE), or are temporarily suspended (e.g., when the applicable match expressions and/or predicates evaluate to FALSE). Multiple virtual machines can be ported concurrently while observing VM priorities and bandwidth throttling.

21 Claims, 13 Drawing Sheets

(56) References Cited

U.S. PATENT DOCUMENTS

2014/0208329 A1    7/2014  Abali et al.

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Amendola, D., et al., "Bandwidth management VMs live migration in wireless fog computing for 5G networks," dated Jan. 22, 2017.
Baccarelli, E., et al., "Minimum-energy bandwidth management for QoS live migration of virtual machines," Computer Networks vol. 93, Part 1, Dec. 24, 2015.
"Move User Guide: Move 4.6," Nutanix, dated Oct. 12, 2022.
"Move Bandwidth Throttling," Nutanix, date found via google as Apr. 18, 2023.
Poitras, Steven. "The Nutanix Bible" (Apr. 27, 2023), from https://www.nutanixbible.com/pdf/classic.pdf (Publication date based on updated doc publication date; first publication date unknown).
Poitras, Steven. "The Nutanix Bible" (May 21, 2024), from https://www.nutanixbible.com/pdf/classic.pdf (Publication date based on updated doc publication date; first publication date unknown).

1B00
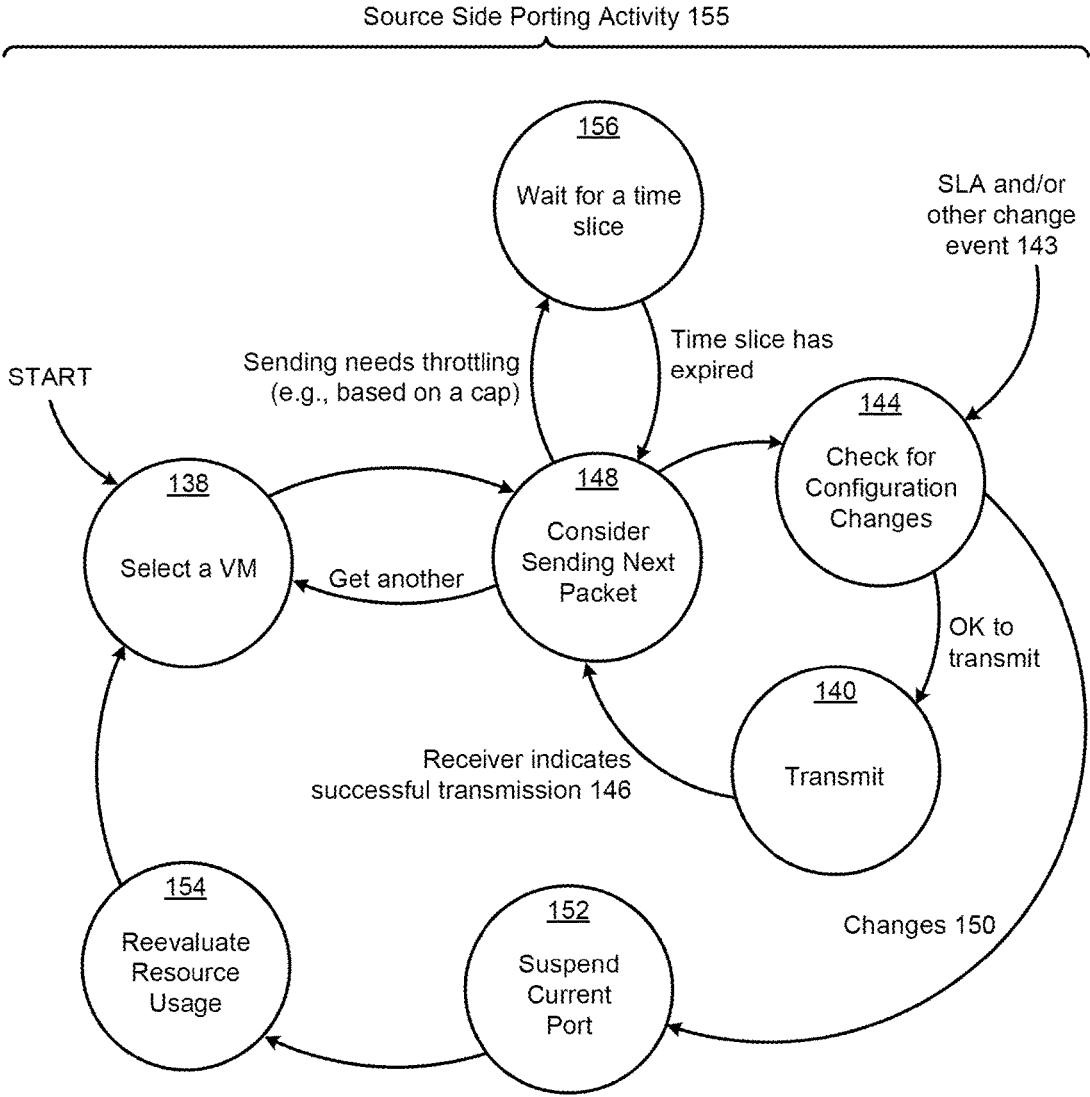
FIG. 1B

1C00
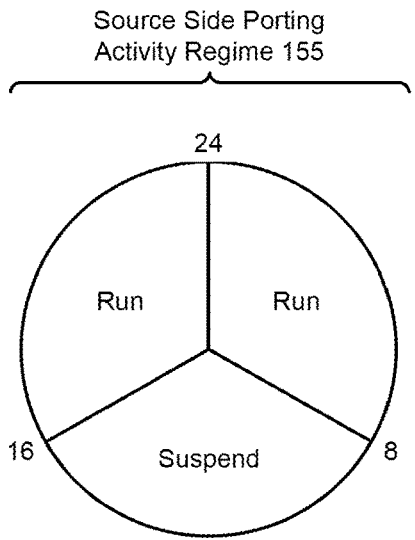
Source Side Porting
Activity Regime 155
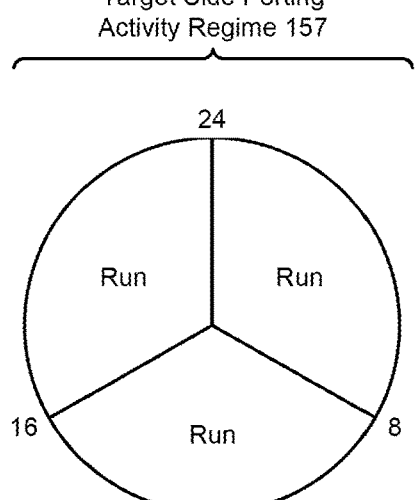
Target Side Porting
Activity Regime 157
FIG. 1C

1D00

200

Planner 120

Throttler 202

204
Identify all matching VMs

206
Calculate total bandwidth needed to satisfy all candidate transmissions for the matched VMs

208
Determine minimum cap from among all limits

210
Queue porting commands with "no sooner than" time designation

Runtime Match Expressions 110

Queues 212

$Q_0$    $Q_1$    · · ·    $Q_N$

Next I/O 214
(based on priority)

Event Processor 124

300

Bandwidth Throttling Provision User Interface     ? | X

Name

| M-Th Daily Scrub |

Scope of Applicability

| All VMs that match where vm.hostCloud="VC-80" |

Frequency

| Specific duration |

Schedules use the local time zone of the Move Appliance (UTC, UTC+0:00)

From                    To

| 11:00 PM |      | 11:59 PM |

On                           Days of the week

◄ [ Monday X ] [ Tuesday X ] [ Wednesday X ] [ Thursday X ] ••• ►

303

Bandwidth Limit

| 0 |

Enter the bandwidth in Mbps (maximum to 100,000 Mbps)

[ Cancel ]   Save

FIG. 3

400
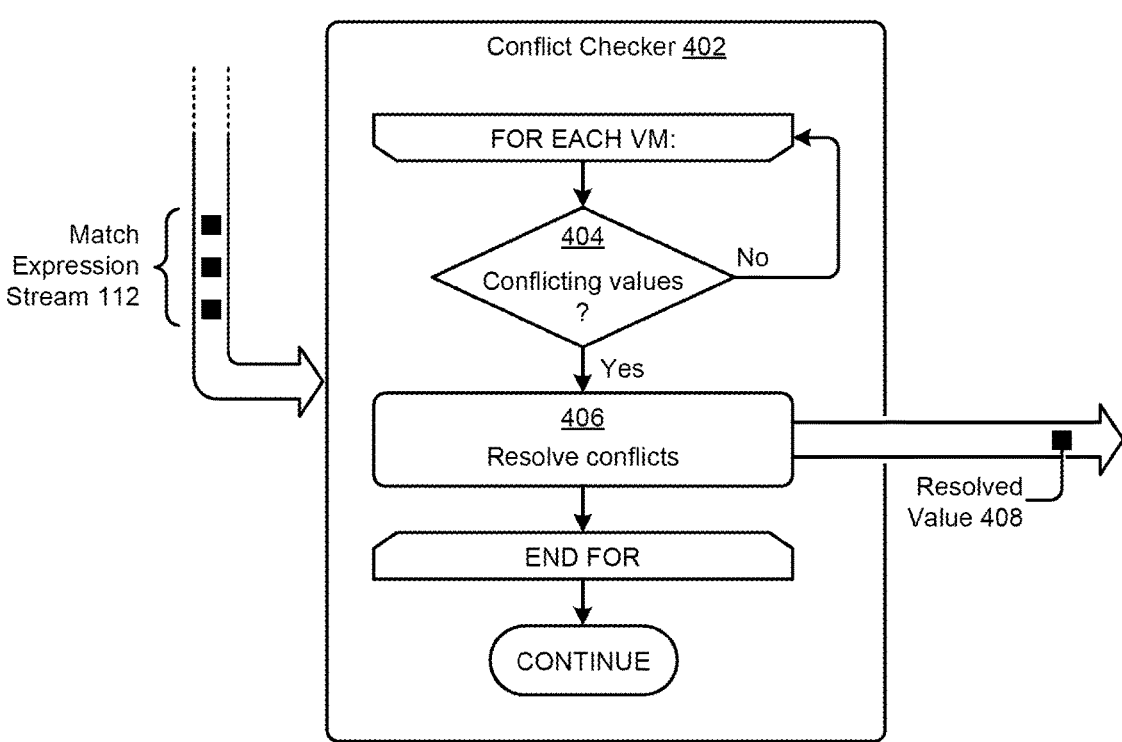
FIG. 4

5A00

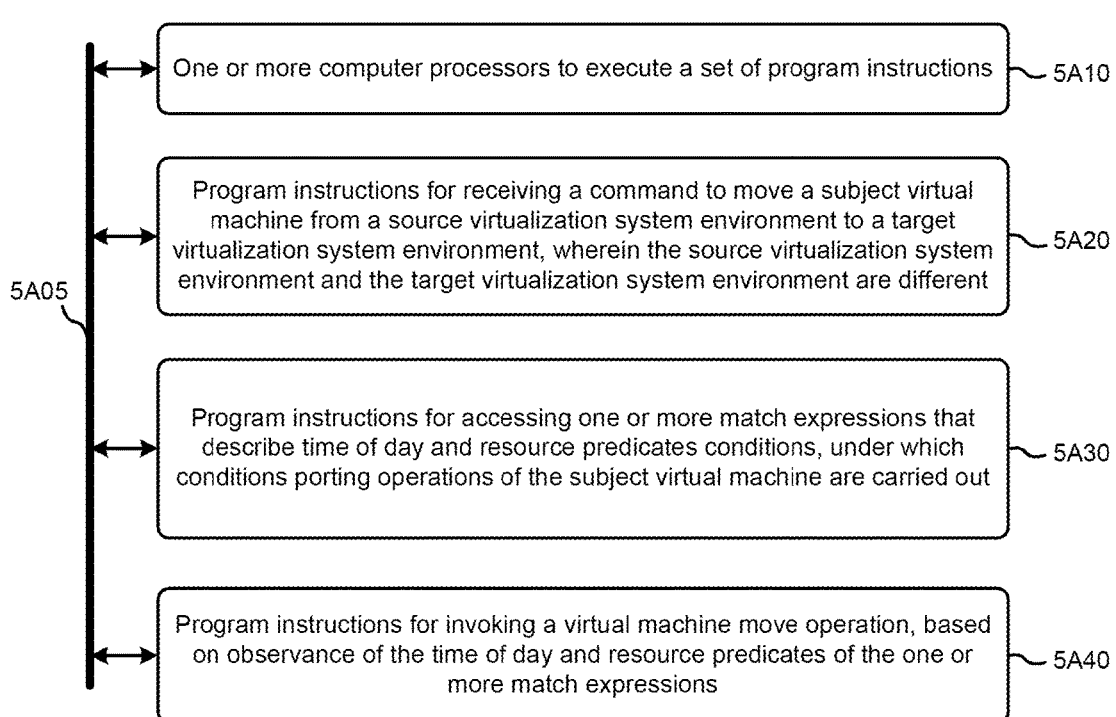

One or more computer processors to execute a set of program instructions ⟿ 5A10

Program instructions for receiving a command to move a subject virtual machine from a source virtualization system environment to a target virtualization system environment, wherein the source virtualization system environment and the target virtualization system environment are different ⟿ 5A20

5A05

Program instructions for accessing one or more match expressions that describe time of day and resource predicates conditions, under which conditions porting operations of the subject virtual machine are carried out ⟿ 5A30

Program instructions for invoking a virtual machine move operation, based on observance of the time of day and resource predicates of the one or more match expressions ⟿ 5A40

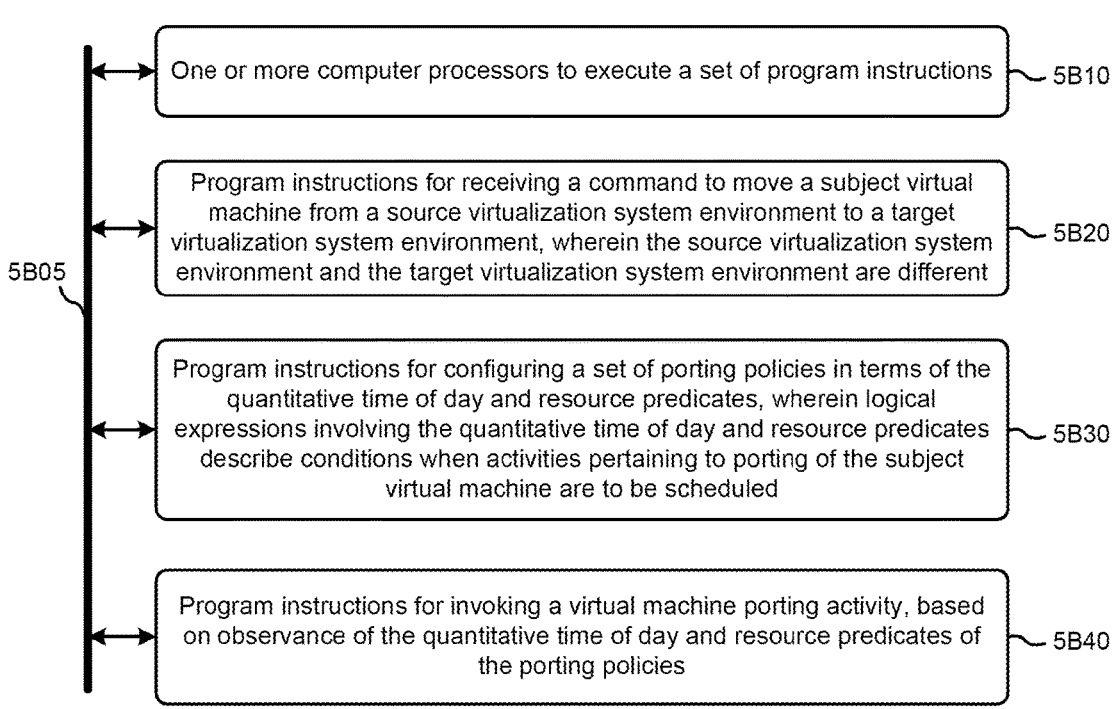

One or more computer processors to execute a set of program instructions ⟋ 5B10

Program instructions for receiving a command to move a subject virtual machine from a source virtualization system environment to a target virtualization system environment, wherein the source virtualization system environment and the target virtualization system environment are different ⟋ 5B20

5B05

Program instructions for configuring a set of porting policies in terms of the quantitative time of day and resource predicates, wherein logical expressions involving the quantitative time of day and resource predicates describe conditions when activities pertaining to porting of the subject virtual machine are to be scheduled ⟋ 5B30

Program instructions for invoking a virtual machine porting activity, based on observance of the quantitative time of day and resource predicates of the porting policies ⟋ 5B40

FIG. 5B

CONTROLLING VIRTUAL MACHINE PORTING ACTIVITY BASED ON DYNAMICALLY-CALCULATED VIRTUAL MACHINE PREDICATE VALUES IN MATCH EXPRESSIONS

RELATED APPLICATIONS

The present application claims the benefit of priority to U.S. Provisional Patent Application Ser. No. 63/534,643 titled "VIRTUAL MACHINE PORTING USING TIME OF DAY AND RESOURCE-AWARE PREDICATES" filed on Aug. 25, 2023, which is hereby incorporated by reference in its entirety.

TECHNICAL FIELD

This disclosure relates to virtualization systems, and more particularly to techniques for controlling virtual machine porting activity based on dynamically-calculated virtual machine predicate values.

COPYRIGHT NOTICE

BACKGROUND

Enterprise computing has advanced significantly in recent years. In addition to advances in hardware (e.g., CPUs, GPUs, higher memory speed at lower cost, etc.), the concept of virtualization of hardware has gained prominence. The idea underlying virtualization is that programs (e.g., processes, tasks, virtual entities) need not be specially configured (e.g., designed, ported, etc.) to accommodate the underlying hardware componentry. Nor do such programs (e.g., virtual machines) even need to be configured for a particular operating system.

In addition to the foregoing advances and the sheer simplicity of deployment afforded to virtualized entities, virtual machines (VMs) have gained prominence because of a confluence of factors, some of which are enumerated in Table 1.

TABLE 1

| Needed features | |
| --- | --- |
| Factor/Concept | Description |
| Hardware Advancements | The increasing capabilities of computer hardware, particularly the improvements in processing power and memory, allow for the efficient allocation of resources to virtualization technologies. As hardware has become more powerful, it is now feasible to divide a single physical server into multiple virtual environments. |
| Server Consolidation | Virtualization offers the opportunity to consolidate multiple physical servers into a single physical server running multiple VMs. This consolidation has resulted in better utilization of server resources, reduced hardware costs, and improved energy efficiency. |

TABLE 1-continued

| Needed features | |
| --- | --- |
| Factor/Concept | Description |
| Isolation and Security | VMs provide a higher level of isolation and security compared to running multiple applications directly on a single server. Each VM operates in its own isolated environment, ensuring that failures or security breaches in one VM do not affect others. |
| Flexibility and Scalability | VMs offer flexibility and scalability by allowing dynamic resource allocation. VMs can be easily provisioned, resized, or migrated between physical hosts to balance workload or respond to changing demands. This flexibility has enabled businesses to adapt and scale their infrastructure more efficiently. |
| Development and Testing | VMs have proven to be valuable for development and testing purposes. Developers can now create VMs with specific configurations, software versions, and testing environments, providing a consistent and reproducible environment. VM snapshots and cloning capabilities have made it easier to revert to a known state or create multiple test environments quickly. |
| Disaster Recovery and High Availability | Deployment of virtualized entities, especially virtual machines, has facilitated improved disaster recovery and high availability solutions. VMs can be replicated, backed up, and restored more easily than physical servers. In the event of a hardware failure or disaster, VMs can be quickly migrated or restarted on alternative hardware, minimizing downtime. |
| Cloud Computing | The rise of cloud computing further accelerated the adoption of virtual machines. Cloud providers leverage VM technology to offer scalable and on-demand virtualized infrastructure to customers, allowing them to focus on their applications without the need for managing physical hardware. |

These factors have both singly and collectively contributed to the increased prominence of virtual machines in enterprise settings. The sheer size of the virtualization space in the IT industry has attracted many players—each vying for a leadership position. The now-present competitive commercial environment, where each virtualization system vendor is vying for their respective leadership positions, has brought about an explosion of features across a panoply of vendor-specific virtualization system platforms. This in turn has resulted in an often repeated scenario where an enterprise chooses (or is forced to) move their virtualization systems (e.g., comprising a first type of hypervisor and corresponding virtual machines) from one (possibly proprietary) system to another (possibly proprietary) virtualization system (e.g., comprising a second, different type of hypervisor and corresponding differently configured virtual machines). Doing so is technically complicated and sometimes resource-demanding. To explain, consider the steps in Table 2, and recognize that all of the steps need to be addressed in order to move a deployment from one virtualization system (e.g., a source virtualization system) to another virtualization system (e.g., a destination virtualization system).

TABLE 2

| Pre-move considerations | |
| --- | --- |
| Aspect | Description |
| Assess compatibility | Ensure that the source and destination hypervisors are compatible with each other. Verify that both types of hypervisors support the same virtual machine formats and that the destination hypervisor can run the guest operating systems of the VMs. |

TABLE 2-continued

| Pre-move considerations | |
| --- | --- |
| Aspect | Description |
| Plan the migration | Create a migration plan that includes details such as the order of migration, downtime requirements, network configurations, and resource allocation on the destination hypervisor. |
| Export or clone VMs | On the source hypervisor, export or clone the VMs to be moved. This process may vary depending on the hypervisor being used. Exporting typically involves creating a virtual machine image file that contains the VM's disk, configuration, and other relevant files. |
| Transfer VM files | Transfer the exported VM files from the source hypervisor to the destination hypervisor. This can be done using various methods such as file transfer protocols, shared storage, and may possibly also include migration tools provided by one or both of the hypervisor vendors. |
| Import or deploy VMs | On the destination hypervisor, import or deploy the VMs using the transferred files. This process also varies depending on the hypervisor. Importing typically involves registering the VM and configuring its settings, such as CPU, memory, and network configurations. |
| Verify and test | Once the VMs have been moved to the destination hypervisors, verify that they are functioning correctly. Test their connectivity, services, and any specific functionality to ensure a successful migration. |
| Update network configurations | Adjust network configurations on the destination hypervisor as needed. This may involve updating IP addresses, network settings, and virtual switches to match the new environment. |
| Transition and decommission | Once it has been determined that the migrated VMs are functioning properly on the destination hypervisors, transition users and services to the new environment. |
| Decommission | Decommission the VMs on the source hypervisor. |

The foregoing planning steps encourage IT professionals to consider planning concepts such as (1) the order of migration, (2) downtime requirements, (3) network configurations, and (4) resource allocation on the destination hypervisor. However these steps fail to consider the details of underlying technologies that can assist in an orderly transition from one virtualization system to another. Furthermore, these failures to consider the details of underlying technologies has caused other problems for the enterprise. For example, enterprises are often very particular about how resources are assigned to individual tasks involved in transitioning from one virtualization system to another. Administrators of such virtualization systems often attempt to establish and enforce policies governing the various individual tasks involved in transitioning from one virtualization system to another virtualization system, however such legacy techniques involving policies end up being overreaching and often devoid of the level of detail needed for transitioning from one virtualization system to another virtualization in the presence of contention for a fixed amount of computing resources.

Even with technologies such as computerized user interfaces, the task of understanding details of the underlying technologies and incorporating such understanding into procedures for transitioning from one virtualization system to another unfortunately demands going far deeper into the underlying technologies that can be comprehended by legacy policy-oriented techniques. Further, legacy policy-oriented techniques (e.g., policies defined by system administrators) are too slow and cumbersome to change, at least in the sense that a system administrator is involved. That is, the dynamic nature of computing systems that undergo dramatic changes in a split second, in combination with the dynamic nature of virtual machine porting activities (which often require runtimes measured in days rather than seconds) exacerbates already untenable policy-based computer administration. What is needed are technologies that address the technological problems involved in porting/transitioning virtual machines (e.g., virtual machine metadata and virtual machine data files) from one virtualization system to a different virtualization system.

The problem to be solved is therefore rooted in various technological limitations of legacy approaches. Improved technologies are needed. In particular, improved applications of technologies are needed to address the aforementioned technological limitations of legacy approaches.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and computer program products that control virtual machine porting activity based on dynamically-calculated virtual machine predicate values used in match expressions, which techniques advance the relevant technologies to address technological issues with legacy approaches. More specifically, the present disclosure describes techniques used in systems, methods, and in computer program products for defining and dynamically re-evaluating resource-aware enforcement predicates pertaining to virtual machine porting.

The ordered combination of steps of the embodiments serve in the context of practical applications that perform steps for defining and using dynamically-calculated virtual machine predicate values to control virtual machine porting activities. These techniques for defining and using dynamically-calculated virtual machine predicate values to control virtual machine porting activities overcome longstanding yet heretofore unsolved technological problems associated with analyzing configurations of virtualized platforms and any corresponding interconnection fabric when transitioning from one virtualization system to a different virtualization system.

Many of the herein-disclosed embodiments for defining and using dynamically-calculated virtual machine predicate values to control virtual machine porting activities are technological solutions pertaining to technological problems that arise in the hardware and software arts that underlie virtualized computing platforms. Aspects of the present disclosure achieve performance and other improvements in peripheral technical fields including, but not limited to, software porting and observing demand profiles on mission critical computing infrastructure.

Some embodiments include a sequence of instructions that are stored on a non-transitory computer readable medium. Such a sequence of instructions, when stored in memory and executed by one or more processors, causes the one or more processors to perform a set of acts for defining and using dynamically-calculated virtual machine predicate values to control virtual machine porting activities.

Some embodiments include the aforementioned sequence of instructions that are stored in a memory, which memory is interfaced to one or more processors such that the one or more processors can execute the sequence of instructions to cause the one or more processors to implement acts for defining and using dynamically-calculated virtual machine predicate values to control virtual machine porting activities.

In various embodiments, any combinations of any of the above can be organized to perform any variation of acts for defining and using dynamically-calculated virtual machine predicate values to control virtual machine porting activities, and many such combinations of aspects of the above elements are contemplated.

Further details of aspects, objectives and advantages of the technological embodiments are described herein and in the figures and claims.

BRIEF DESCRIPTION OF THE DRAWINGS

The drawings described below are for illustration purposes only. The drawings are not intended to limit the scope of the present disclosure.

FIG. 1B shows a state diagram for implementing change-aware virtual machine porting, according to an embodiment.

FIG. 1C depicts time-of-day mapping techniques as used in systems that define and use dynamically-calculated virtual machine predicate values in match expressions for virtual machine porting, according to an embodiment.

FIG. 3 depicts a graphical user interface that facilitates user configuration of match expressions and/or bandwidth-limiting expressions, according to an embodiment.

FIG. 4 is a block diagram showing an example conflict resolution technique as used in systems that define and use dynamically-calculated virtual machine predicate values in match expressions for virtual machine porting, according to an embodiment.

FIGS. 5A and 5B depict system components as an arrangement of computing modules that are interconnected so as to implement certain of the herein-disclosed embodiments.

DETAILED DESCRIPTION

Figure 1A:
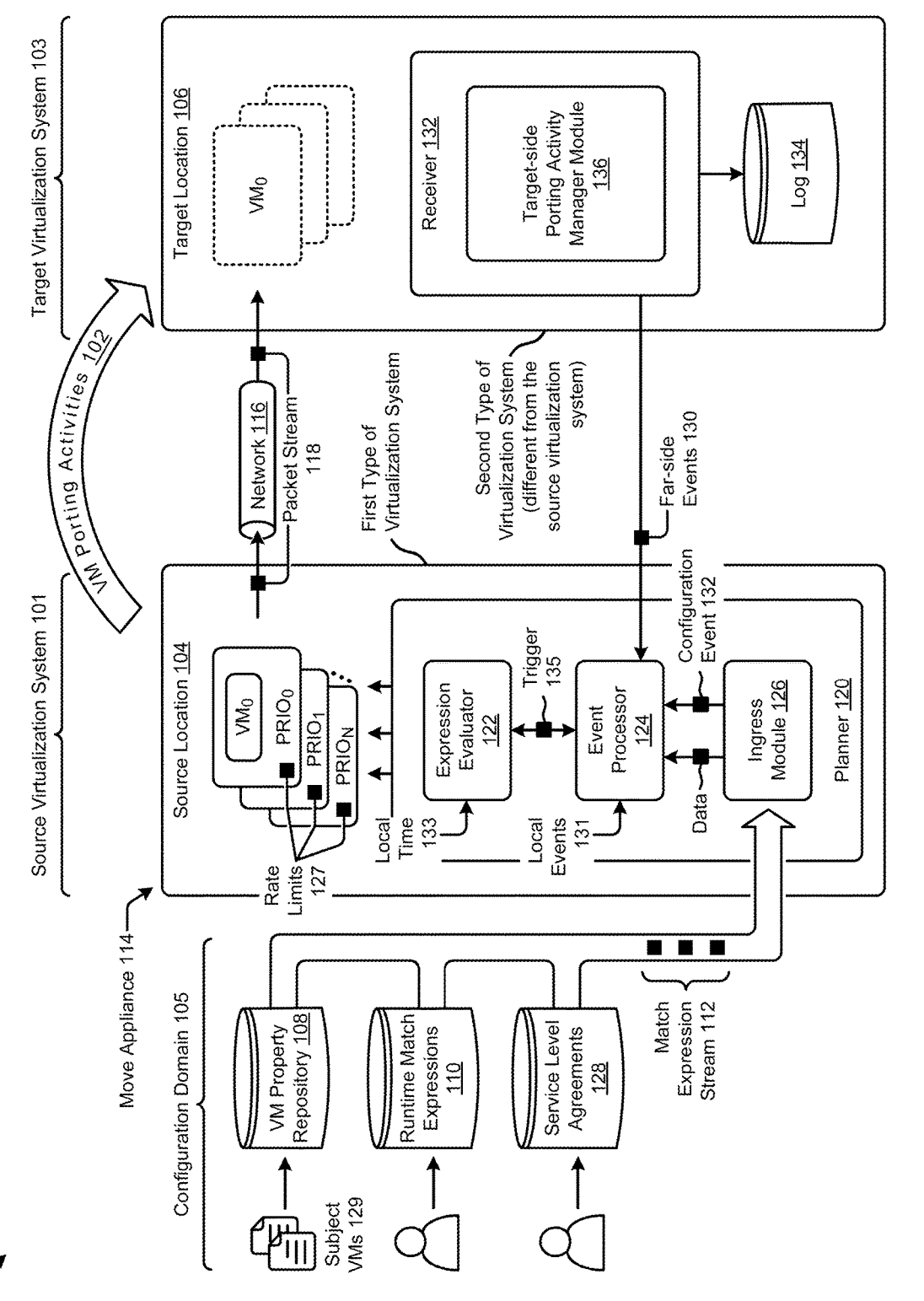
FIG. 1A shows a block diagram of a system for defining and using dynamically-calculated virtual machine predicate values to control virtual machine porting activities, according to an embodiment.

Aspects of the present disclosure solve problems associated with using computer systems for analyzing configurations of virtualized platforms and the virtualized platforms' interconnection fabric when transitioning from one virtualization system to a different virtualization system. These problems are unique to computer-implemented methods encountered when transitioning from one virtualization system to a different virtualization system. Some embodiments are directed to approaches for defining and using dynamically-calculated virtual machine predicate values to control (e.g., throttle) virtual machine porting activities.

The accompanying figures and discussions herein present example environments, systems, methods, and computer program products for defining and using time of day and resource-aware enforcement predicates to control virtual machine porting activities.

As used herein the term "porting" or to "port a virtual machine" refers to the totality of operations that are invoked and/or carried out during the process of moving a subject virtual machine from one type of virtualization system (e.g., from a first virtualization system vendor) to another, different type of virtualization system (e.g., to a second virtualization system vendor). Carrying out a port is sometime referred to as a "move". The term "port" and the term "move" are used interchangeably herein. The set of operations involved in a move or a port may include, but are not limited to, (1) translating virtual machine metadata from one set of representations and semantics to another set of representations and semantics, (2) communicating virtual machine configuration data from a source location to a target location, (3) synchronizing initiation of the subject virtual machine at the target location, and (4) retiring the subject virtual machine at the source location.

In many cases, the virtualization system at the source location differs from the virtualization system at the target location at least because a first type or first configuration of the hypervisor used in the virtualization system at the source location differs from a second type or second configuration of the hypervisor used in the virtualization system at the target location. Importantly, the set of operations involved in a move or a port often includes communicating virtual machine data (e.g., the definition of and contents of vDisks) from a source location to a target location. It often happens that the data contents of such vDisks is voluminous, involving many terabytes of data that is to be communicated over a packet switched network.

Due to the disparity between the vast amount of data of a vDisk as compared with much more modest communication resources of inter-platform communication fabrics, communicating virtual machine data between systems often requires long running times. Moreover, acts of communicating virtual machine data between systems are often in contention with other processes of the involved systems. If fact, it sometimes happens that the acts of communicating virtual machine data between systems is often in contention with bandwidth demands from mission-critical processes that are already in play on the involved systems.

Accordingly, customers want to limit the amount of communication bandwidth consumed during inter-system virtual machine porting. To do so very often involves multiple sets of dynamically-determined conditions. For example, and as shown in Table 3 below, a data synchronization process will be permitted during the week MON-FRI but only if there is enough bandwidth availability (e.g., a "Bandwidth Headroom" of 90 Mbps), whereas on SAT-SUN, the move can contend for networking resources with other processes so long as there is at least 10 Mbps of bandwidth availability.

TABLE 3

| Day-of-week and time of day scheduling | | |
| --- | --- | --- |
| Days of the Week | Time Window | Minimum Bandwidth Headroom |
| MON-FRI | 9 am-5 pm | 90 Mbps |
| SAT-SUN | 10 pm-12 am | 10 Mbps |

The foregoing is merely one species (i.e., time of day scheduling) of the genus of time- and bandwidth-aware service level agreements. Other techniques are shown and described hereunder.

Bandwidth Capped Service Level Agreements

Consider the construct of a bandwidth capped service level agreement (SLA) that codifies service level agreement terms and conditions. Such a service level agreement can be codified as:

1. A match expression that specifies one or more virtual machine properties (e.g., where vm.name matches "*sales*" AND vm.region=="us-west-1", etc.); and 2. A bandwidth cap that is associated with a match expression; and 3. Optionally, start and end times that bound one or more time windows.

The match expression can be used to determine what objects (e.g., virtual machines) the service level agreement definition corresponds to. Furthermore, in this example, the match expression includes predicate constructions (vm-.name) as well as match operators (e.g., the keyword "matches") and logical operators (e.g., the keyword "AND") that are evaluated relative to the matched objects. The aforementioned bandwidth cap is merely one of a wide variety of predicate values.

All or parts of these SLA definitions, in particular the foregoing match expressions and bandwidth caps, are persisted for fast retrieval from a dedicated namespace and/or some other sort of partitioning of a key value store. Moreover, all or parts of these SLA definitions are codified in a tree-oriented data structure for fast evaluation. Strictly as an implementation choice, bandwidth cap values can range from 0 to some arbitrarily large or "infinite" value. For the convenience of the agent that defines SLA definitions, a default cap of "infinite" is applied.

As used herein, a match expression is a set of conditions based on virtual machine property values wherein, when the set of conditions based on the virtual machine property values is present or TRUE for a particular VM, then that VM is deemed to be selected. A match expression and/or its individual constituent predicates can be evaluated at runtime of a porting activity based on then-current virtual machine property values.

As used herein a predicate is a statement that can be evaluated to a value of TRUE or FALSE, or UNKNOWN. For example the statement "vm.name="KeyStoreDaemon"" is a statement that would evaluate to TRUE when applied to a virtual machine whose name is "KeyStoreDaemon", and would evaluate to FALSE when applied to a virtual machine whose name is not "KeyStoreDaemon". Predicates can be defined by referencing a variable, and such a variable can be evaluated at runtime of a porting activity to result in a predicate value. Multiple predicates can be used in a match expression (e.g., conjoined by a logical AND or logical OR, etc.) and multiple match expressions can constitute a service level agreement.

Startup and Ongoing Operations

On startup (e.g., when a virtual machine is slated to be ported from a source virtualization system to a target virtualization system), all applicable SLA definitions are parsed. Match expressions corresponding to these applicable service level agreement definitions are evaluated based on the then-current conditions of the source system. If evaluation of the match conditions result in a non-null set of VMs, then those VMs are considered ready to run.

Since the then-current conditions of the source system change dynamically, a match expression monitoring thread is started. This match expression monitoring thread watches for changes to the namespace of the aforementioned key-value store so that in the event that there are new service level agreements or changes/updates to existing SLAs, any match expression evaluations will use the new or changed key values.

Ongoing Enforcement

Porting of a virtual machine from a source virtualization system to a target virtualization system is often a long-running task—sometimes requiring several days of run time. This is to be contrasted with legacy migration or porting activities that are associated with runtimes in a few hundred milliseconds. Accordingly, long-lived, in-memory objects are allocated and such objects are configured for frequent, fast and repeated access over the full lifetime of the long-running porting task. An in-memory object might hold code for (1) a match expression evaluator, (2) a rate limiter agent, and (3) a CRON scheduler. When the object is constructed, a then-current bandwidth cap is calculated based on the then-current time and any predicates and/or logical expressions involving the predicates. Based on this, an initial bandwidth cap value is established. Furthermore, a separate CRON scheduler thread is started with its initial values. Due to the nature of a CRON job, most of the time the thread is sleeping. However the thread is awakened whenever there is a change made to the key-value store. This is because it is possible that a change to a SLA or a change to a match expression or a change to a virtual machine's property might result in applicability and/or a change to the bandwidth cap.

During the data movement from the source virtualization system to the target virtualization system, there might be many moments when bandwidth caps might come into force or there might be many moments when bandwidth caps might be deactivated or relaxed. Accordingly, many times during data movement from the source virtualization system to the target virtualization system an agent of the source system will iterate over the aforementioned in-memory objects to generate a then-current list of all in-memory SLA definitions that apply a particular subject virtual machine.

Dynamic Response to Changing Conditions

As previously indicated, porting of a virtual machine from a source virtualization system to a target virtualization system is often a long-running task—sometimes requiring several days of run time. Accordingly, since the run times are long, it makes sense to reconsider the then-current conditions to be sure any applicable service level agreements are satisfied. Reconsideration might happen on a regular time-wise pattern (e.g., daily or hourly), or reconsideration might occur at higher periodicity and/or at a far greater frequency. Moreover, applicable service level agreements and corresponding runtime reconsideration might involve changes in an IP address, and/or changes in bandwidth-providing infrastructure, and/or changes in VM properties, and/or changes in a schedule. Strictly as one example of the latter case, it might be desired to suspend porting activities when there is a scheduled maintenance event. This can be accommodated in systems that are able to provide a dynamic response to changing conditions (e.g., the newly-entered schedule of the aforementioned maintenance event).

One approach that implements a dynamic response to changing conditions involves repeated reconsideration of then-current conditions in advance of commencing any operation involved in a move of a subject virtual machine from a source virtualization system environment to a target virtualization system environment. Such an approach is now briefly discussed by way of illustrative examples.

Real-time Evaluation of Match Expressions

Example: For every bandwidth-consuming move operation, and before invoking such a bandwidth-consuming move operation, any applicable rate limitations (e.g., bandwidth caps) are considered. As pertaining to the heretofore-described implementation, the rate limiter values of all matching service level agreements are considered, and a maximum permitted bandwidth is determined. The bandwidth-consuming move operation is held up if it would potentially exceed the determined maximum permitted bandwidth. This ensures that if there are multiple applicable SLAs that are deemed to correspond to a particular subject VM, each bandwidth-consuming move operation would be throttled to the lowest bandwidth cap value of all applicable service level agreements. In the case that there are multiple requests at any moment in time, a plurality of VM priorities are determined and taken into account. Accordingly, move operation requests from VMs that have higher determined priorities are dispatched before move operation requests from VMs that have lower priorities.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiment even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A shows a block diagram of a system for defining and using dynamically-calculated virtual machine predicate values to control virtual machine porting activities. As an option, one or more variations of system 1A00 or any aspect thereof may be implemented in the context of the architecture and functionality of the embodiments described herein and/or in any environment.

This figure is being presented to illustrate the function and juxtaposition of computing component that are used to port virtual machines from a first type of virtualization system (e.g., source virtualization system 101) to a second type of virtualization system (e.g., target virtualization system 103). More particularly, the figure is being presented to illustrate coordination of virtual machine porting activities 102 between a source location 104 and a target location 106. The figure depicts merely one implementation possibility where multiple virtual machines at a source location are dynamically prioritized and purposely resource throttled so as to comport with any one or more service level agreements 128 that apply to the involved resources.

In this embodiment, a planner 120 produces a schedule of VM porting activities that are then carried out using the available resources—the use of which resources might be purposely limited based on any of a variety of then-current conditions. More specifically, the planner is configured so as to control virtual machine porting activities based on dynamically-calculated conditions (e.g., based on then-current virtual machine predicate values, and/or based on then-current SLAs, and/or based on then-current match expressions).

Now, referring to elements showing under the configuration domain 105, any number of subject VMs 129 (e.g., virtual machines that are to be ported from the source location to the target location) have respective virtual machine properties. Such virtual machine properties can be stored (e.g., via the shown VM property repository 108) in any location that is accessible, directly or indirectly, by operational elements at the source location. In some cases a collection of operational elements at the source location are configured on dedicated hardware known as an appliance (e.g., move appliance 114).

In other cases, a collection of operational elements at the source location are configured to carry out VM porting activities concurrent with mission-critical operations taking place at the source location. Regardless of whether the VM porting activities are carried out using dedicated hardware, or whether VM porting activities are carried out concurrently with mission-critical and other customer/user operations, it is desired that bandwidth demands by the VM porting activities do not inadvertently impinge on the mission-critical and other customer/user operations, and/or that that bandwidth demands by the VM porting activities do not violate any in-force service level agreements. This can be accomplished by codifying dynamically-determined conditions into predicate-laden expressions (e.g., the shown runtime match expressions 110) that can be calculated and re-calculated quickly and efficiently at any moment in time and repeatedly at a high rate of frequency.

As is known in the art, it can happen that the set of subject VMs 129 and/or their respective properties and/or any predicate or predicated value or other aspect of a match expression can change (and do change) very frequently (e.g., even to a sub-second cadence or even faster). Accordingly, as time progresses, there may be an ongoing stream of new and/or changed match expressions (e.g., the shown match expression stream 112).

Individual constituents of such an ongoing stream of new and/or changed match expressions is ingested by the planner, possibly as facilitated by an ingress module 126. The ingress module in turn is able to distinguish certain types of events as well as certain types of data, which events and corresponding data are provided to an event processor 124 of the planner. Such an event processor is configured to ingest any of a wide range of events. For example, and as shown, event processor 124 is able to ingest events corresponding to (1) a change of a VM property or a change to a runtime match expression (e.g., configuration event 132), (2) occurrence of one or more events from outside the source location (e.g., far-side events 130), and/or (3) events that originate from or are forwarded by the source system to the event processor (e.g., local events 131).

As can be understood by one of skill in the art, it can happen that the event processor frequently triggers (e.g., via trigger 135) expression evaluator 122. Additionally or alternatively, the expression evaluator can be triggered by the fact of local time 133 reaching some a priori known date and time (e.g., Monday at 9 am).

It can now be seen that the planner, through operation of its constituent components, is in a position to be able to schedule VMs as candidates for move operations (e.g., data communication) over network 116. In fact, the planner, through operation of its constituent components, is capable of scheduling move operations down to the network I/O operation (e.g., down to the packet level). Moreover, through operation of the planner's constituent components, the planner is able to manage any number of priority queues (e.g., queue $prio_0$, queue $prio_1$, . . . , queue $prio_N$). The separate queues are defined and managed so as to facilitate adherence to a priority scheme, whereby move operations corresponding to VMs that have higher determined priorities are dispatched before move operations corresponding to VMs that have lower determined priorities. In this manner, and in view of the architecture of the foregoing queues, it is possible to compare an alternate virtual machine's priority to the subject virtual machine's priority, and to then choose which virtual machine to service based on the result of the comparison.

As such, it can happen that the shown packet stream 118 might interleave packets originating from one VM with packets originating from another VM. In exemplary implementations, each network I/O operation is considered prior to initiation of said network I/O operation so as to determine if performance of said network I/O operation would potentially violate any in-force SLAs. If it is deemed that performance of the aforementioned network I/O operation would potentially violate any in-force service level agreement (SLA), then initiation of that network I/O operation is delayed until a later time, at least until any in-force bandwidth limitations (e.g., the queue-specific occurrences of rate limits 127) are predicted to be satisfied.

In the situation where a move operation (e.g., a network I/O operation) is initiated, a module on the target side (e.g., the shown receiver 132) processes data in the packet. The data in the packet sometimes includes identification of the specific operation to be performed at the target side. To facilitate identification and carrying out of such specific operations, the receiver is configured to instantiate and/or cooperate with target-side porting activity manager module 136. Such a target-side porting activity manager module is capable of keeping track of events and states, as well as logging (e.g., into log 134) events and states. Ongoing tracking of events and states serves to keep the source location and the target location in synchronicity—even though the porting activity may involve one or more long-running tasks.

As can now be understood, there are many reasons why conditions (e.g., configurations) pertaining to the source virtualization system might change. Moreover, there are many reasons why conditions pertaining to the source virtualization system might change rapidly. Accordingly, a change-aware virtual machine porting protocol needs to be in place and agreed to by and between operational elements of the source location and operational elements of the target location. One way to describe a change-aware virtual machine porting protocol is to show states and change events in a state diagram. One such state diagram is shown and discussed as pertains to FIG. 1B.

FIG. 1B shows a state diagram for implementing change-aware virtual machine porting. As an option, one or more variations of state diagram 1B00 or any aspect thereof may be implemented in the context of the architecture and functionality of the embodiments described herein and/or in any environment.

The figure shows a state diagram pertinent to source side porting activity regime 155. The state diagram is shown with a "START" indication, however initial processing through the states can commence from any state, or based on any condition or event. Notably, the state diagram includes a cycle of states whereby a check for configuration changes (e.g., in state 144) is carried out before a packet transmission (e.g., in transmit state 140) is initiated. This is because it could happen that the configuration change (e.g., SLA and/or other change event 143) is such that the timing and extent of the next packet transmission would potentially violate any then in-force bandwidth cap or other SLA provision. The state diagram includes repeated consideration as to whether or not to send a next packet (state 148). In this manner, due at least in part to the consideration actions taken in state 148, it is possible to consider any changes in service level agreements during the timeframe between I/O operations that constitute the virtual machine porting activity.

More specifically, if/when a check for configuration changes (e.g., state 144) determines that there are one or more configuration changes would at least potentially affect a bandwidth cap or other SLA characteristic, then rather than transmitting the next packet, which would potentially violate any then in-force bandwidth cap or other SLA, the current porting activity is temporarily suspended (e.g., by suspending in state 152) until such time as changes 150 can be reevaluated relative to then current resource usages (e.g., at state 154). Alternatively, it might be "OK to transmit", in which case control passes to state 140 wherein the packet is transmitted. After the receiver indicates successful transmission 146, control again passes to state 148 for consideration of a next packet. The next packet might be able to be sent while not breaching any in-force bandwidth cap, or it might be that a wait state is incurred.

Said re-evaluation and corresponding actions responsive to the re-evaluation might result in a change in a throttling parameter, or, it might not. In either case, a candidate virtual machine is selected (e.g., state 138). The selected candidate virtual machine can be drawn from one of the priority queues (e.g., queue $prio_0$, queue $prio_1$, . . . , queue $prio_N$ of FIG. 1A). Control passes to state 148 where consideration is given to the next candidate packet. It can happen that in the course of considering resources demanded by the next candidate packet, it is determined that the sending stream is to be throttled, in which case state 156 is entered to wait for a period (e.g., until the time slice has expired), the duration of which time slice can be dynamically-predicted based on the throttling cap and predicted bandwidth demands by other operational elements (e.g., possibly mission-critical processes).

During the duration after it is deemed to wait for a time slice, it is still possible for the porting activities to continue. This is because a porting action pertaining to a different VM, or even merely a different packet, might not need to be throttled. To accommodate this possibility (e.g., to get another packet), control can be passed back to state 138, where a candidate VM is selected and progression through the states is resumed. As is known in the art, bandwidth demand conditions on any given communication port can change very quickly (e.g., to go instantaneously from 100% utilization and 0% headroom, to 0% utilization and 100% headroom). Accordingly, it might be that the same candidate VM is selected in a second pass.

As previously mentioned there are many reasons why conditions might change. Moreover there are also many reasons why certain changes in conditions would affect resource usage. One class of changes to conditions that shift from 6 pm to midnight, and a night shift from midnight to 8 am. Various allow or deny designations (e.g., "Run" or "Suspend") can be assigned to any of the shifts, and (as shown) there can be differences between the various allow or deny designations that arise due to differences between the source side and the target side. More specifically, assignment of shifts can be the same or can be different as pertaining to, respectively, source side porting activity regime 155 and target side porting activity regime 157. To explain, it can happen that a significant amount of processing takes place on the target side even before a ported VM can be initiated on the target side. Strictly as one example, a large amount of data that had been encoded, encrypted and/or compacted on the source side might need to be unencoded, unencrypted and/or uncompacted before use on the target side. In certain cases the resources needed to accomplish the unencoding, the unencryption, and/or the uncompaction might involve both networking resources as well as CPU resources.

As earlier indicated, there can be many reasons why changes in conditions of the overall system would affect resource usage. Managing the many types or classes of changes in conditions of the overall system becomes highly complicated by the fact that certain predicate values relate to certain other predicate values. Moreover, there are some certain changes that relate to other certain changes only in the presence of other conditions, and/or once some certain changes are subjected to logical operations involving a plurality of changes. One way to manage this complication is to define a match expression syntax, which syntax has corresponding semantics. Several examples of match expressions are given in Table 4.

TABLE 4

| | Example match expressions | |
|---|---|---|
| Row | Match Expressions (in an example syntax) | Semantics (corresponding to the example syntax) |
| 1 | vm.name matches "*sales*" and vm.networks in ['network-1', 'network-2'] | Match all sales VMs attached to network-1 or network-2. |
| 2 | vm.disks.datastore == "datastore-1" or len(vm.snapshots) > 2 | Find the VMs where one of its vDisks is stored on datastore-1 or if the VM has more than 2 snapshots. |
| 3 | Match WHEN ((vm.A me.op1 vm.B) me.op2 (vm.C me.op3 vm.D) | Find the VMs for which the match expression evaluates to TRUE. | would affect resource usage arises because of changes in any one or more of, changes to VM parameters, changes to match expressions, and changes to SLAs. Another class of changes that would affect resource usage arises because of the progression of time into a particular time of day (e.g., morning, evening, night). This can happen, for example, when an SLA or a match expression includes some allow or deny predicate that involve a wall clock time or time range that is mapped to such an allow or deny predicate. Any known technique can be used to perform such a mapping, one of which is shown and described as pertains to FIG. 1C.

FIG. 1C depicts time-of-day mapping techniques as used in systems that define and use dynamically-calculated virtual machine predicate values in match expressions for virtual machine porting. As an option, one or more variations of time-of-day mapping techniques 1C00 or any aspect thereof may be implemented in the context of the architecture and functionality of the embodiments described herein and/or in any environment.

In this illustrative technique, a wall clock is divided into three shifts, a daytime shift from 8 am to 6 pm, a nighttime The first two rows of Table 4 use the VM property "vm.name" as well as the VM properties "vm.networks" and "disk.datastore". These properties can be drawn from a VM property repository. Further, the then-current values for these properties can also be drawn from the same (or different) VM property repository. In some cases, then-current values for these properties can also be drawn from a key-value store.

The third row in Table 4 includes a verb "Match" and a query qualifier "WHEN". This syntax involves the specified VM properties vm.A, vm.B, vm.C, and vm.D, which properties are interrelated by match operators me.Op1, me.Op2, and me. Op3. The "Match" verb finds any/all VMs for which, at the time of evaluation, the match expression evaluates to TRUE.

The availability of such a powerful set of semantics makes for ease of specification of interrelated conditions, however it brings in a complication, namely that the then-current values of such match expressions might need to be known for each and every transmission (e.g., see transmit state 140 of FIG. 1B). Accordingly, a high-performance match expression evaluation technique needs to satisfy: (Requirement 1) avoid unnecessary re-evaluation of match expressions, and (Requirement 2) evaluate a match expression very quickly and/or with absence of unnecessary calculations. One way to address Requirement 1 above is to implement a match expression evaluator (e.g., expression evaluator 122 of FIG. 1) that is triggered only when there is a change to a parameter that is used in a match expression. One way to address Requirement 2 is to codify match expressions in an expression tree. An example expression tree is shown and described as pertains to FIG. 1D. The match expression evaluation technique disclosed herein satisfies both Requirement 1 and Requirement 2.

Figure 1D:
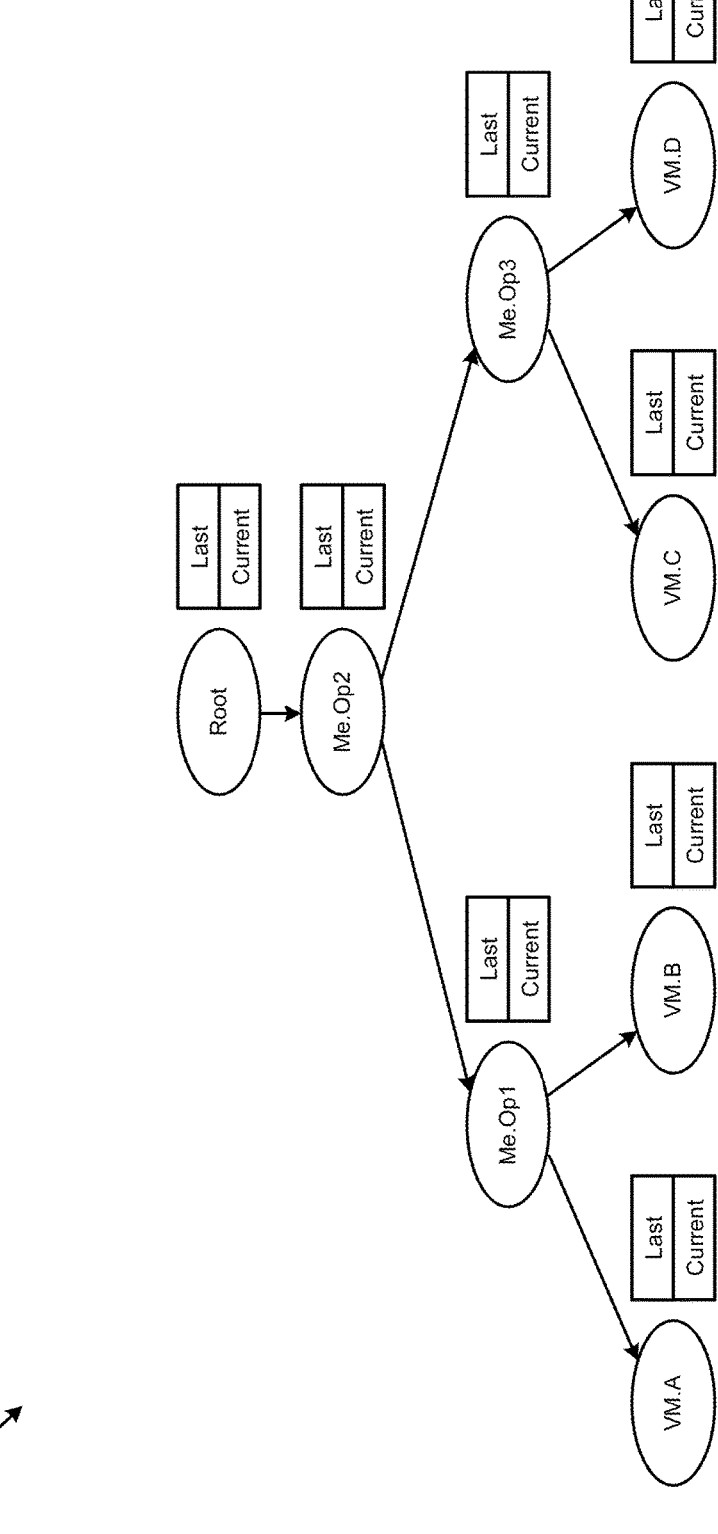
FIG. 1D depicts an expression tree used by an expression evaluator in systems that define and use dynamically-calculated virtual machine predicate values in match expressions, according to an embodiment.

FIG. 1D depicts an expression tree used by an expression evaluator in systems that define and use dynamically-calculated virtual machine predicate values in match expressions. As an option, one or more variations of expression tree 1D00 or any aspect thereof may be implemented in the context of the architecture and functionality of the embodiments described herein and/or in any environment.

This example corresponds to the match expression of the bottom row of Table 4. Specifically, this example depicts a set of VM property operands (e.g., the shown vm.A, vm.B, vm.C, and vm.D), as well as a set of match expression operators (e.g., the shown me.Op1, me.Op2, and me.Op3). Each of the properties and operators are represented as respective nodes in a graph (i.e., expression tree 1D00), and each node of the graph has its associated data items, "Last" and "Current". Using such an expression tree to represent an arbitrarily complex match expression facilitates parsimonious re-evaluation of match expressions. To explain, in any re-evaluation of a match expression, only the nodes that are at and/or upstream of a node that has changed data (i.e., the "Current" value is different from the "Last" value) need to be re-evaluated. As such, it often happens that only one branch, or sometimes only one node, needs to be re-evaluated upon a trigger. Moreover, in exemplary embodiments, re-evaluation is only considered for commencement when there is a detected change in the key-value store that holds the predicate values used in the match expressions.

Now, (1) having a syntax to form an arbitrarily complex match expression involving any number of dynamically-changing predicate values, and (2) having a way to rapidly re-evaluate match expressions leads to the capability for real-time throttling of move operations-even when prosecution of the move operations span a long period of time (e.g., many hours or days).

Figure 2:
FIG. 2 shows a technique for throttling bandwidth demands of virtual machine move operations during long-running porting activities, according to an embodiment.

FIG. 2 shows a technique for throttling bandwidth demands of virtual machine move operations during long-running porting activities. As an option, one or more variations of the shown technique 200 or any aspect thereof may be implemented in the context of the architecture and functionality of the embodiments described herein and/or in any environment.

As shown, throttler 202 is situated in planner 120. However this is merely an implementation choice, and the throttler functionality can be implemented in accordance with any partitioning and using any known techniques. When the throttler is triggered, possibly during porting activities involving traversal through states of state diagram 1B00, and possibly upon entering state 148 state diagram 1B00, throttler 202 is invoked, which in turn commences at step 204 to evaluate all runtime match expressions 110 so as to identify all matching VMs. There may be multiple matched VMs, each of which may have different characteristics. The matched VMs are considered as a group and, at step 206, the total bandwidth needed to satisfy all candidate transmissions is calculated. In some cases, there may already be bandwidth caps assigned to one or more of the candidate VMs. In such a case, the more/most conservative bandwidth cap (i.e., a lower or lowest demand) is used (step 208). In many cases, there is sufficient headroom and all candidate transmissions can be accomplished without breaching any in-force bandwidth cap. However, if/when it is deemed that the next candidate transmission would breach an in-force bandwidth cap, then step 210 serves to enter details of the next candidate transmission into a priority queue.

Asynchronously, and possibly independent of any re-calculated bandwidth cap, porting operations corresponding to the matched VM are scheduled into respective priority queues 212. The topmost item that exists in the highest priority queue (e.g., in this implementation, the queue with the lowest priority designation) is identified as the next I/O 214. The identified next I/O is then offered to event processor 124.

FIG. 3 depicts a graphical user interface that facilitates user configuration of match expressions and/or bandwidth-limiting expressions. As an option, one or more variations of graphical user interface 300 or any aspect thereof may be implemented in the context of the architecture and functionality of the embodiments described herein and/or in any environment.

The figure is being presented to illustrate one way to establish a bandwidth throttling provision (e.g., a match expression) via a user interface. In this example, a blackout period (i.e., when porting activities are explicitly suspended) occurs just before midnight each week on Monday through Thursday. This accommodates mission-critical processing known as a weekly-recurring "M-Th Daily Scrub". In this case, the "Scope of Applicability" is desired to cover all VMs that are hosted on the particular virtual cloud implementation named "VC-80".

The information provided in the shown "Bandwidth Throttling Provision User Interface" is used to define aspects of an SLA, and the specific bandwidth limiting provision "0" is used in match expressions. In this example, designation of the specific duration 11:00 pm to 11:59 pm and the bandwidth limit 303 being specified as "0" means that no bandwidth usage at all is permitted by the porting operations during that time period each week on Monday through Thursday.

Pressing the "Save" button of the shown user interface results in an SLA comprising (1) a match expression that includes the predicates, "vm.host matches 'VC-80'" and (2) a bandwidth cap of "0" that is associated with the match expression. This particular example also includes time of day start and end times that bound time windows just before midnight on four days of the week, specifically Monday through Thursday nights.

Table 5 presents a codification in the syntax of a computer language that supports specification of match expressions, repeat/recurring timings, time windows, and corresponding bandwidth caps. The example of Table 5 is variation of the computer language that underlies user specifications suggested in the foregoing user interface example. Specifically, this variation shows how different individual time windows can be associated with respective bandwidth caps.

TABLE 5

Abridged version of computer language for user specifications

| Row # | Computer Language |
|---|---|
| 1 | [{ |
| 2 | "Name":"M-Th Daily Scrub", |
| 3 | "MatchExpression";"SourceHostname==\"10.46.17.155\"", |
| 4 | "IsActive": false, |
| 5 | "Schedules":[ |
| 6 | { |
| 7 | "CronExpr":"@daily", // A daily schedule |
| 8 | "BwcapMbps":50 |
| 9 | }, |
| 10 | { |
| 11 | "CronExpr":"JAN-MAR", // 1st quarter of the year |
| 12 | "BwcapMbps": 150 |
| 13 | }, |
| 14 | ], |
| 15 | "WindowSchedules": [ |
| 16 | { |
| 17 | "StartTimeHours": 9, |
| 18 | "StartTimeMins": 0, |
| 19 | "EndTimeHours": 17, |
| 20 | "EndTimeMins": 0, |
| 21 | "DaysOfTheWeek": ["MON","TUE","WED","THU", "FRI"], // 9am-5pm weekdays |
| 22 | "BwcapMbps":50 |
| 23 | }, |
| 24 | { |
| 25 | "StartTimeHours": 22, |
| 26 | "StartTimeMins": 15, |
| 27 | "EndTimeHours": 22, |
| 28 | "EndTimeMins": 30, |
| 29 | "DaysOfTheWeek": ["SAT"], // STOP all traffic (0 cap) for a 15 min window at 10:15pm on SAT for scheduled maintenance |
| 30 | "BwcapMbps":0 |
| 31 | }, |
| 32 | { |
| 33 | "StartTimeHours": 9, |
| 34 | "StartTimeMins": 0, |
| 35 | "EndTimeHours": 17, |
| 36 | "EndTimeMins": 0, |
| 37 | "DaysOfTheWeek": ["SAT","SUN"],// 9am-5pm weekends only |
| 38 | "BwcapMbps":180 |
| 39 | }]} |

Of course the foregoing are merely examples. There are many other ways to be able to specify provisions of an SLA, and there are many other ways to codify match expressions. In fact, it is possible that multiple system administrators independently codify match expressions even without using a graphical user interface, and possibly without coordination between the multiple system administrators. Accordingly, there needs to be some way to identify potential conflicts that may have been introduced by the independent actions of the multiple system administrators. Moreover, there needs to be a way to resolve potential conflicts. One possible conflict resolution technique is shown and described as pertains to FIG. 4.

FIG. 4 is a block diagram showing an example conflict resolution technique as used in systems that define and use dynamically-calculated virtual machine predicate values in match expressions for virtual machine porting. As an option, one or more variations of conflict resolution technique 400 or any aspect thereof may be implemented in the context of the architecture and functionality of the embodiments described herein and/or in any environment.

The figure depicts an example conflict checker 402. The conflict checker can be invoked at any time, and can be re-run at any time. Strictly as one example, the conflict checker can be run whenever there is a new match expression (e.g., a new match expression in match expression stream 112). Additionally or alternatively, the conflict checker can be run whenever there is a need to calculate/re-calculate a then-current bandwidth throttling value (e.g., while in state 144 of the source side porting activity of FIG. 1B).

The processing of conflict checker 402 includes a FOR EACH loop, in which loop a plurality of subject VMs (e.g., subject VMs that were matched by a match expression) are considered with respect to their respective VM parameters. In the specific case where two or more VMs have the same property, but different/conflicting values (e.g., as determined at decision 404), processing flow within the conflict checker proceeds to a step to resolve conflicts (step 406). The resolution of the conflict can be based on the nature of the property and/or the respective values. For example if there are two or more VMs that are each associated with a throttling value (e.g., as depicted by bandwidth limit 303 of FIG. 3), then, in a conservative regime, the lowest of the multiple throttling values is chosen as the resolved value 408.

As another example, consider a scenario where there are two different throttling values defined via two different SLAs (e.g., SLA1 And SLA2), and where both SLAs are concurrently in force and where both SLAs apply to a particular VM. Further consider the scenario where SLA1 specifies "throttle all 'sales' vms from 10 pm-12 am to 50 Mbps," and where SLA2 specifies, "throttle all 'sales' vms running on host1 from 9 pm-11 pm to 40 Mbps."

In a porting configuration that is porting only a single VM, say a sales vm running on host, the two in-force SLAs are in conflict from 10 pm-11 pm since both SLAs apply to the 'sales' vm during that time window. In a conservative regime, the lowest of the multiple throttling values will take effect and the 'sales' vm will be throttled to the lower of 50 Mbps versus 40 Mbps.

If multiple vms are being ported concurrently, they may each get individually throttled at even lower values as a result of aggregate bandwidth use so as to not violate the overall bandwidth limits defined in any in-force and applicable SLA. For example, assume there is a second sales vm on host2 being ported concurrently with the sales vm on host1. Further consider that they have 'Higher and 'Lower' priorities respectively. This is shown in Table 6.

TABLE 6

Example conflict resolution scenario

| VM | Priority | Matching SLAs | 9-10 pm throughput (computed vs actual) | 10-11 pm throughput (computed vs actual) | 11 pm-12 am throughput (computed vs actual) |
|---|---|---|---|---|---|
| Sales VM-1 on host 1 | Higher | SLA1, SLA2 | 40/40 | 40/40 | 50/50 |

TABLE 6-continued

| | | | Example conflict resolution scenario | | |
| --- | --- | --- | --- | --- | --- |
| VM | Priority | Matching SLAs | 9-10 pm throughput (computed vs actual) | 10-11 pm throughput (computed vs actual) | 11 pm-12 am throughput (computed vs actual) |
| Sales VM-2 on host 2 | Lower | SLA1 | No Limit/10 | 50/10 | 50/0 |

Now, assume all VMs are able to saturate the entire available bandwidth. For the time window 9-10 pm, VM-1 matches SLA-2 and is throttled to 40 Mbps while VM-2 matches neither SLA-1, nor SLA-2 and is therefore not throttled. Consequently, it can drive the network throughput to whatever value it can saturate, say 150 MBps.

For the time window 10-11 pm, VM-1 at the 'Higher' priority matches both SLA-1 and SLA-2 and is throttled to min (40,50), which is 40 Mbps. At the same time, VM-2 is designated to be at a 'Lower' priority will end up getting throttled to 10 Mbps so as to not exceed the overall throttling value of 50 Mbps (e.g., 40 Mbps+10 Mbps) as defined in SLA1. If VM-1 stops contending/doing network I/O for any reason at (for example) 10:11 pm (e.g., due to some sort of failure during the course of the porting), then VM-2 will be throttled to 50 Mbps from 10:11 pm onwards. As such, its actual throughput may jump from 10 Mbps (while in contention with VM-1) to 50 Mbps (after VM-1 has stopped contending/doing network I/O).

Additional Embodiments of the Disclosure

Instruction Code Examples

FIG. 5A depicts a block diagram of a system to perform certain functions of a computer system. As an option, the system 5A00 may be implemented in the context of the architecture and functionality of the embodiments described herein. Of course, however, system 5A00 or any operation therein may be carried out in any desired environment. The system 5A00 comprises at least one processor and at least one memory, the memory serving to store program instructions corresponding to the operations of the system. As shown, an operation can be implemented in whole or in part using program instructions accessible by a module. The modules are connected to a communication path 5A05, and any operation can communicate with any other operations over communication path 5A05. The modules of the system can, individually or in combination, perform method operations within system 5A00. Any operations performed within system 5A00 may be performed in any order unless as may be specified in the claims. The shown embodiment implements a portion of a computer system, presented as system 5A00, comprising one or more computer processors to execute a set of program code instructions (module 5A10) and modules for accessing memory to hold program code instructions to perform: receiving a command to move a subject virtual machine from a source virtualization system environment to a target virtualization system environment, wherein the source virtualization system environment and the target virtualization system environment are different (module 5A20); accessing one or more match expressions that describe time of day and resource predicates conditions, under which conditions porting operations of the subject virtual machine are carried out (module 5A30); and invoking a virtual machine move operation, based on observance of the time of day and resource predicates of the one or more match expressions (module 5A40).

FIG. 5B depicts system 5B00 as an arrangement of computing modules that are interconnected so as to operate cooperatively to implement certain of the herein-disclosed embodiments. This and other embodiments present particular arrangements of elements that, individually or as combined, serve to form improved technological processes that address analyzing configurations of virtualized platforms and the virtualized platforms' interconnection fabric when transitioning from one virtualization system to a different virtualization system. The partitioning of system 5B00 is merely illustrative and other partitions are possible. As an option, system 5B00 may be implemented in the context of the architecture and functionality of the embodiments described herein. Of course, however, system 5B00 or any operation therein may be carried out in any desired environment. The system 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with any other operations over communication path 5B05. The modules of the system can, individually or in combination, perform method operations within system 5B00. Any operations performed within system 5B00 may be performed in any order unless as may be specified in the claims. The shown embodiment implements a portion of a computer system, presented as system 5B00, comprising one or more computer processors to execute a set of program code instructions (module 5B10) and modules for accessing memory to hold program code instructions to perform embodiments of the herein-disclosed techniques:

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture OverView

Additional System Architecture Examples

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 6A, FIG. 6B, FIG. 6C, and FIG. 6D.

Figure 6A:
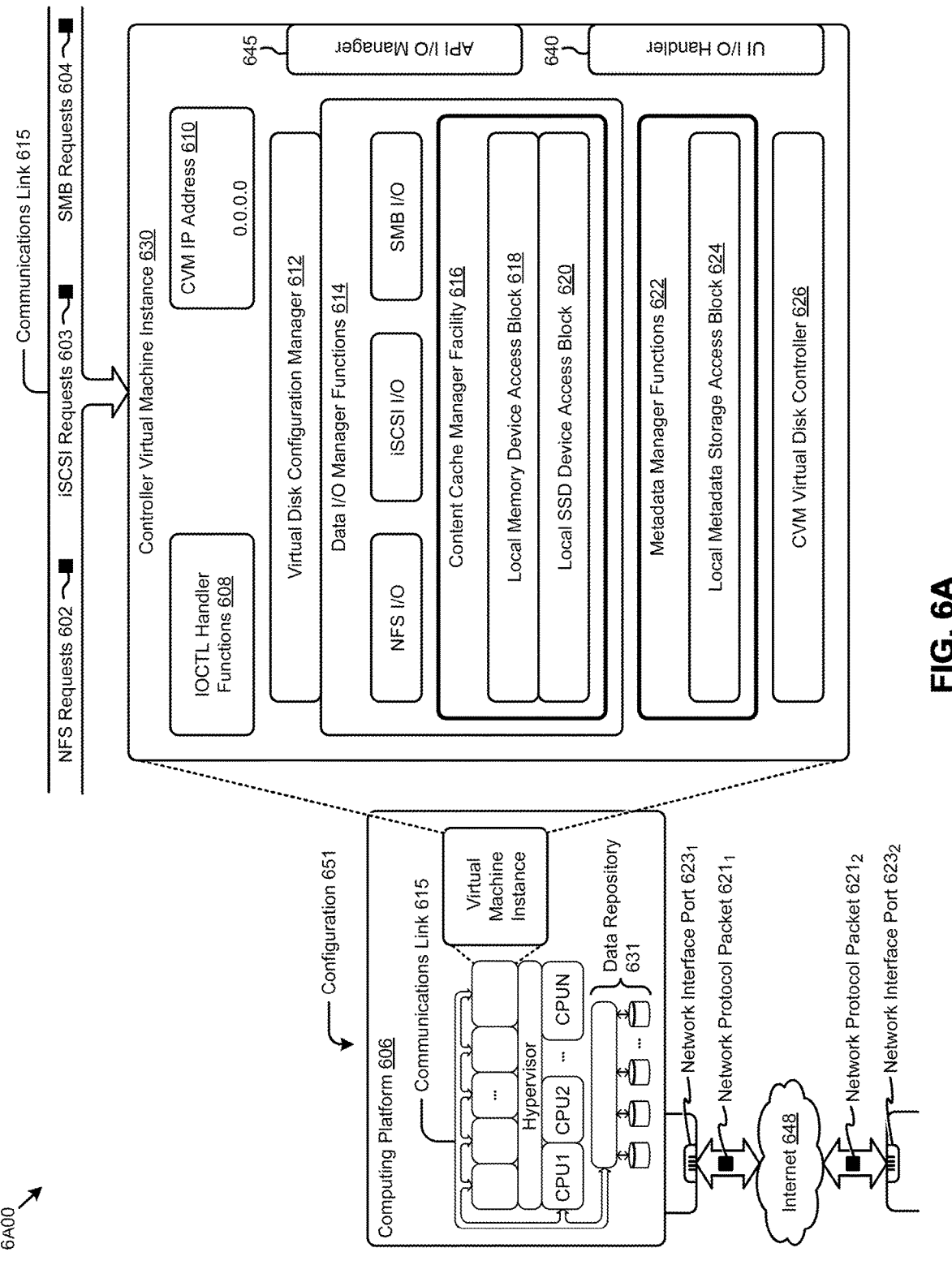
FIG. 6A, FIG. 6B, FIG. 6C, and FIG. 6D depict virtualization system architectures comprising collections of interconnected components suitable for implementing embodiments of the present disclosure and/or for use in the herein-described environments.

FIG. 6A depicts a virtualized controller as implemented in the shown virtual machine architecture 6A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 6A00 comprises a collection of interconnected components suitable for implementing embodiments of the present disclosure and/or for use in the herein-described environments. Moreover, virtual machine architecture 6A00 includes a virtual machine instance in configuration 651 that is further described as pertaining to controller virtual machine instance 630. Configuration 651 supports virtual machine instances that are deployed as user virtual machines, or controller virtual machines or both. Such virtual machines interface with a hypervisor (as shown). Some virtual machines are configured for processing of storage inputs or outputs (I/O or IO) as received from any or every source within the computing platform. An example implementation of such a virtual machine that processes storage I/O is depicted as 630.

In this and other configurations, a controller virtual machine instance receives block I/O storage requests as network file system (NFS) requests in the form of NFS requests 602, and/or internet small computer system interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output can be handled by one or more IO control (IOCTL) handler functions (e.g., IOCTL handler functions 608) that interface to other functions such as data IO manager functions 614 and/or metadata manager functions 622. As shown, the data IO manager functions can include communication with virtual disk configuration manager 612 and/or can include direct or indirect communication with any of various block IO functions (e.g., NFS IO, iSCSI IO, SMB IO, etc.).

In addition to block IO functions, configuration 651 supports input or output (IO) of any form (e.g., block IO, streaming IO) and/or packet-based IO such as hypertext transport protocol (HTTP) traffic, etc., through either or both of a user interface (UI) handler such as UI IO handler 640 and/or through any of a range of application programming interfaces (APIs), possibly through API IO manager 645.

Communications link 615 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 630 includes content cache manager facility 616 that accesses storage locations, possibly including local dynamic random access memory (DRAM) (e.g., through local memory device access block 618) and/or possibly including accesses to local solid state storage (e.g., through local SSD device access block 620).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 631, which in turn can be formatted into any one or more storage areas, and which can comprise parameterized storage accessible by a key (e.g., a filename, a table name, a block address, an offset address, etc.). Data repository 631 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 624. The data repository 631 can be configured using CVM virtual disk controller 626, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . , CPUN). According to certain embodiments of the disclosure, two or more instances of configuration 651 can be coupled by communications link 615 (e.g., backplane, local area network, public switched telephone network, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port $623_1$ and network interface port $623_2$). Configuration 651 can be addressed through one or more network interface ports using an IP address. Any operational element within computing platform 606 can perform sending and receiving operations using any of a range of network protocols, possibly including network protocols that send and receive packets (e.g., network protocol packet $621_1$ and network protocol packet $621_2$).

Computing platform 606 may transmit and receive messages that can be composed of configuration data and/or any other forms of data and/or instructions organized into a data structure (e.g., communications packets). In some cases, the data structure includes program instructions (e.g., application code) communicated through the Internet 648 and/or through any one or more instances of communications link 615. Received program instructions may be processed and/or executed by a CPU as it is received and/or program instructions may be stored in any volatile or non-volatile storage for later execution. Program instructions can be transmitted via an upload (e.g., an upload from an access device over the Internet 648 to computing platform 606). Further, program instructions and/or the results of executing program instructions can be delivered to a particular user via a download (e.g., a download from computing platform 606 over the Internet 648 to an access device).

Configuration 651 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 62 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to defining and using time and resource-aware enforcement predicates for virtual machine porting. In some embodiments, a module may include one or more state machines and/or combinational logic used to implement or facilitate the operational and/or performance characteristics pertaining to defining and using time and resource-aware enforcement predicates for virtual machine porting.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of defining and using time and resource-aware enforcement predicates for virtual machine porting). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to defining and using time and resource-aware enforcement predicates for virtual machine porting, and/or for improving the way data is manipulated when performing computerized operations pertaining to defining and using time and resource-aware enforcement predicates for virtual machine porting.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 6B:
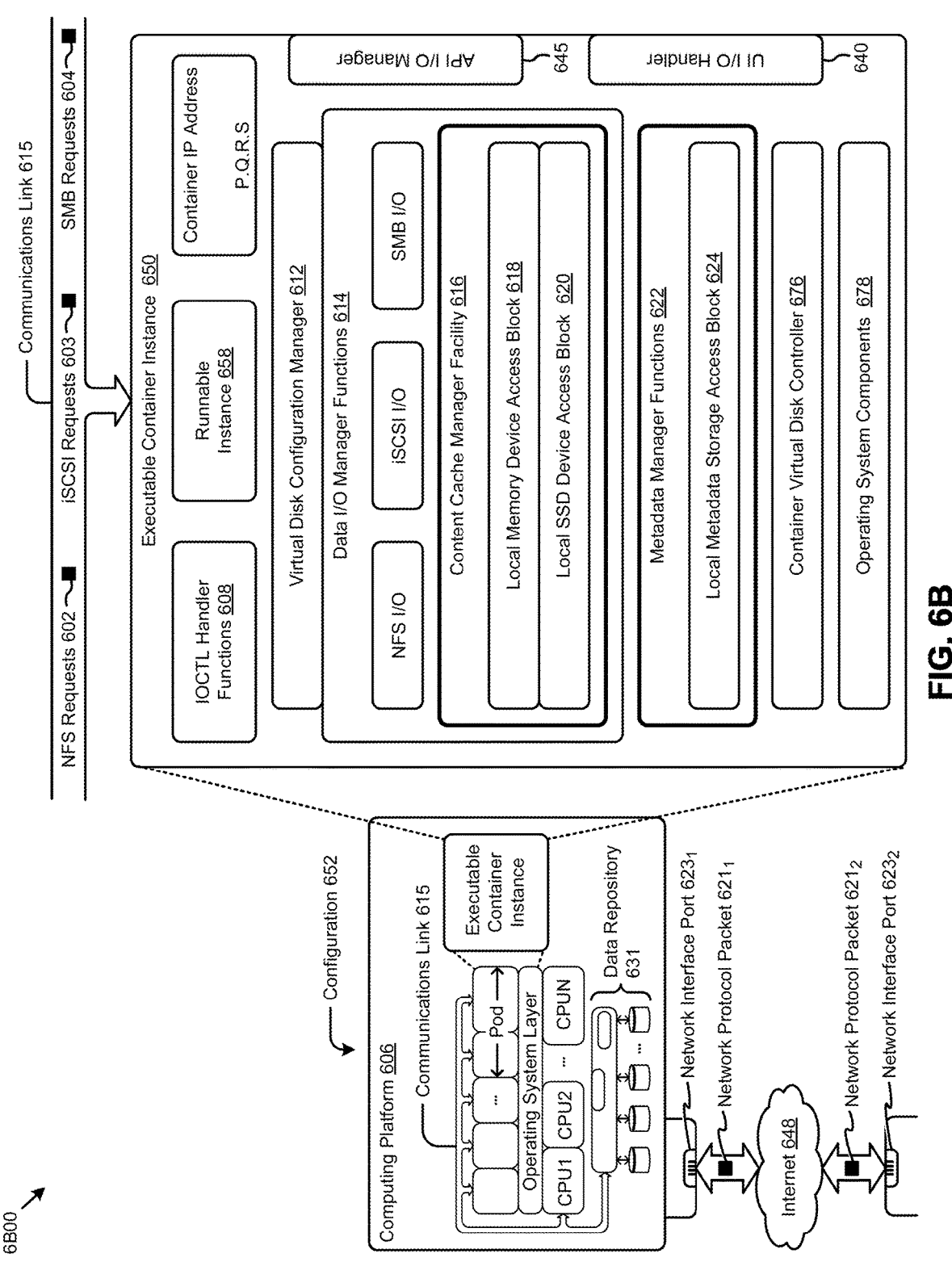

FIG. 6B depicts a virtualized controller implemented by containerized architecture 6B00. The containerized architecture comprises a collection of interconnected components suitable for implementing embodiments of the present disclosure and/or for use in the herein-described environments. Moreover, the shown containerized architecture 6B00 includes an executable container instance in configuration 652 that is further described as pertaining to executable container instance 650. Configuration 652 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 650). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a corresponding virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 678, however such a separate set of operating system components need not be provided. As an alternative, an executable container can include runnable instance 658, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
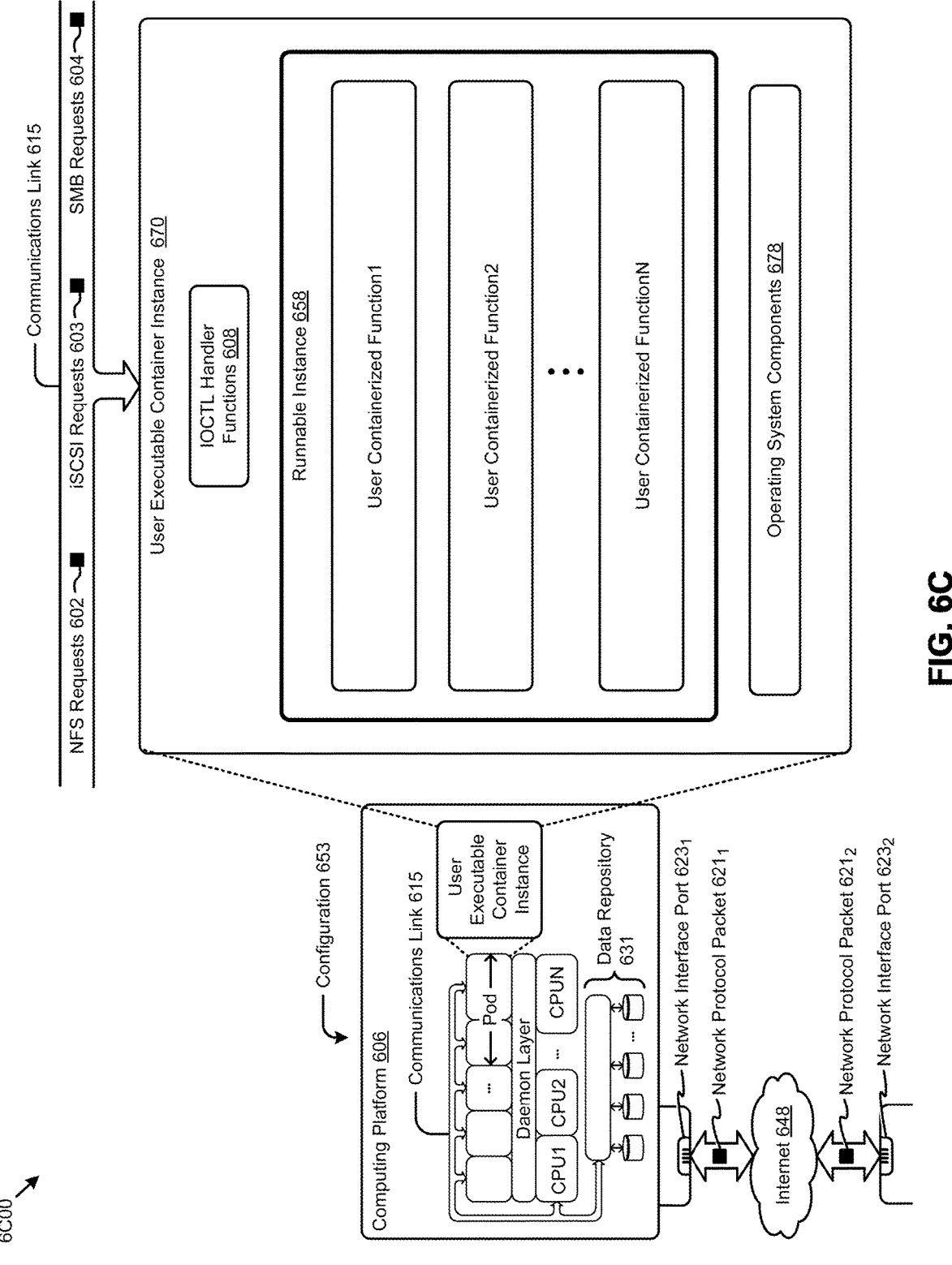

FIG. 6C depicts a virtualized controller implemented by a daemon-assisted containerized architecture 6C00. The containerized architecture comprises a collection of interconnected components suitable for implementing embodiments of the present disclosure and/or for use in the herein-described environments. Moreover, the shown daemon-assisted containerized architecture includes a user executable container instance in configuration 653 that is further described as pertaining to user executable container instance 670. Configuration 653 includes a daemon layer (as shown) that performs certain functions of an operating system.

User executable container instance 670 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 658). In some cases, the shown operating system components 678 comprise portions of an operating system, which portions are interfaced with or included in the runnable instance and/or any user containerized functions. In this embodiment of a daemon-assisted containerized architecture, the computing platform 606 might or might not host operating system components other than operating system components 678. More specifically, the shown daemon might or might not host operating system components other than operating system components 678 of user executable container instance 670.

The virtual machine architecture 6A00 of FIG. 6A and/or the containerized architecture 6B00 of FIG. 6B and/or the daemon-assisted containerized architecture 6C00 of FIG. 6C can be used in any combination to implement a distributed platform that contains multiple servers and/or nodes that manage multiple tiers of storage where the tiers of storage might be formed using the shown data repository 631 and/or any forms of network accessible storage. As such, the multiple tiers of storage may include storage that is accessible over communications link 615. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 651 of FIG. 6A) to manage the interactions between the underlying hardware and user virtual machines or containers that run client software.

Distinct from user virtual machines or user executable containers, a special controller virtual machine (e.g., as depicted by controller virtual machine instance 630) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 6D:
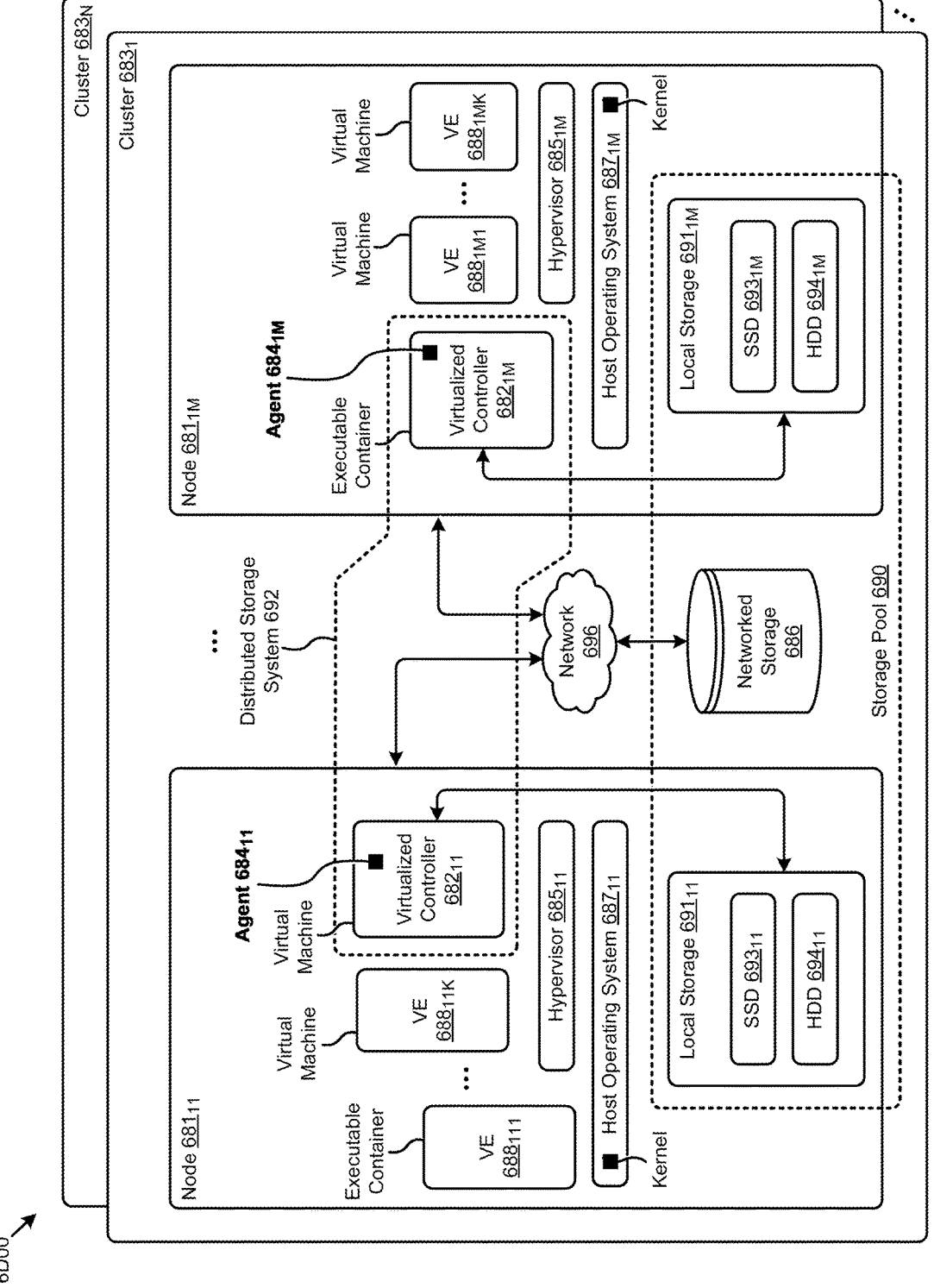

FIG. 6D depicts a distributed virtualization system in a multi-cluster environment 6D00. The shown distributed virtualization system is configured to be used to implement the herein disclosed techniques. Specifically, the distributed virtualization system of FIG. 6D comprises multiple clusters (e.g., cluster 683$_1$, . . . , cluster 683$_N$) comprising multiple nodes that have multiple tiers of storage in a storage pool. Representative nodes (e.g., node 681$_{11}$, . . . , node 681$_{1M}$) and storage pool 690 associated with cluster 683$_1$ are shown. Each node can be associated with one server, multiple servers, or portions of a server. The nodes can be associated (e.g., logically and/or physically) with the clusters. As shown, the multiple tiers of storage include storage that is accessible through a network 696, such as a networked storage 686 (e.g., a storage area network or SAN, network attached storage or NAS, etc.). The multiple tiers of storage further include instances of local storage (e.g., local storage 691$_{11}$, . . . , local storage 691$_{1M}$). For example, the local storage can be within or directly attached to a server and/or appliance associated with the nodes. Such local storage can include solid state drives (SSD 693$_{11}$, . . . , SSD 693$_{1M}$), hard disk drives (HDD 694$_{11}$, . . . , HDD 694$_{1M}$), and/or other storage devices.

As shown, any of the nodes of the distributed virtualization system can implement one or more user virtualized entities (VEs) such as the virtualized entity (VE) instances shown as VE $688_{111}$, . . . , VE $688_{11K}$, . . . , VE $688_{1M1}$, . . . , VE $688_{1MK}$, and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $687_{11}$, . . . , host operating system $687_{1M}$), while the VMs run multiple applications on various respective guest operating systems. Such flexibility can be facilitated at least in part by a hypervisor (e.g., hypervisor $685_{11}$, . . . , hypervisor $685_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $687_{11}$, . . . , host operating system $687_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 690 by the VMs and/or the executable containers.

Multiple instances of such virtualized controllers can coordinate within a cluster to form the distributed storage system 692 which can, among other operations, manage the storage pool 690. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $681_{11}$ can interface with a controller virtual machine (e.g., virtualized controller $682_{11}$) through hypervisor $685_{11}$ to access data of storage pool 690. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 692. For example, a hypervisor at one node in the distributed storage system 692 might correspond to software from a first vendor, and a hypervisor at another node in the distributed storage system 692 might correspond to a second software vendor. As another virtualized controller implementation example, executable containers can be used to implement a virtualized controller (e.g., virtualized controller $682_{1M}$) in an operating system virtualization environment at a given node. In this case, for example, the virtualized entities at node $681_{1M}$ can access the storage pool 690 by interfacing with a controller container (e.g., virtualized controller $682_{1M}$) through hypervisor $685_{1M}$ and/or the kernel of host operating system $687_{1M}$.

In certain embodiments, one or more instances of an agent can be implemented in the distributed storage system 692 to facilitate the herein disclosed techniques. Specifically, agent $684_{11}$ can be implemented in the virtualized controller $682_{11}$, and agent $684_{1M}$ can be implemented in the virtualized controller $682_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to defining and using time and resource-aware enforcement predicates for virtual machine porting can be brought to bear through implementation of any one or more of the foregoing techniques. Moreover, any aspect or aspects of analyzing configurations of virtualized platforms and the virtualized platforms' interconnection fabric when transitioning from one virtualization system to a different virtualization system can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor, to perform acts for controlling virtual machine porting activity based on dynamically-calculated virtual machine predicate values, the acts comprising:

receiving a command to move a subject virtual machine from a source virtualization system environment to a target virtualization system environment, wherein the source virtualization system environment and the target virtualization system environment are different;

accessing one or more match expressions that describe time of day and resource predicate conditions under which porting operations of the subject virtual machine are carried out; and invoking a virtual machine move operation, based on observance of the time of day and resource predicate conditions of the one or more match expressions.

2. The non-transitory computer readable medium of claim 1, further comprising instructions which, when stored in memory and executed by the processor, cause the processor to perform further acts of:

identifying a set of service level agreements;

evaluating one or more virtual machine predicate values in the match expressions of the set of service level agreements; and prior to invoking an I/O operation of the virtual machine porting activity, instead, temporarily suspending the virtual machine porting activity.

3. The non-transitory computer readable medium of claim 2, further comprising instructions which, when stored in memory and executed by the processor, cause the processor to perform further acts of:

associating two or more bandwidth caps to respective virtual machines; and observing a lower one of the two or more bandwidth caps.

4. The non-transitory computer readable medium of claim 2, wherein evaluating the one or more virtual machine predicate values in the match expressions is carried out after invoking the virtual machine move operation.

5. The non-transitory computer readable medium of claim 2, further comprising instructions which, when stored in memory and executed by the processor, cause the processor to perform further acts of, considering the set of service level agreements in a timeframe between I/O operations that constitute the virtual machine porting activity.

6. The non-transitory computer readable medium of claim 1, further comprising instructions which, when stored in memory and executed by the processor, cause the processor to perform further acts of:

comparing an alternate virtual machine's priority to the subject virtual machine's priority; and choosing which virtual machine to service based on the comparing.

7. The non-transitory computer readable medium of claim 1, wherein the source virtualization system environment hosts a first type of hypervisor that is different from a second type of hypervisor hosted by the target virtualization system environment.

8. A method for controlling virtual machine porting activity based on dynamically-calculated virtual machine predicate values, the method comprising:

receiving a command to move a subject virtual machine from a source virtualization system environment to a target virtualization system environment, wherein the source virtualization system environment and the target virtualization system environment are different;

accessing one or more match expressions that describe time of day and resource predicate conditions under which porting operations of the subject virtual machine are carried out; and invoking a virtual machine move operation, based on observance of the time of day and resource predicate conditions of the one or more match expressions.

9. The method of claim 8, further comprising:

identifying a set of service level agreements;

evaluating one or more virtual machine predicate values in the match expressions of the set of service level agreements; and prior to invoking an I/O operation of the virtual machine porting activity, instead, temporarily suspending the virtual machine porting activity.

10. The method of claim 9, further comprising:

associating two or more bandwidth caps to respective virtual machines; and observing a lower one of the two or more bandwidth caps.

11. The method of claim 9, wherein evaluating the one or more virtual machine predicate values in the match expressions is carried out after invoking the virtual machine move operation.

12. The method of claim 9, further comprising, considering the set of service level agreements in a timeframe between I/O operations that constitute the virtual machine porting activity.

13. The method of claim 8, further comprising:

comparing an alternate virtual machine's priority to the subject virtual machine's priority; and choosing which virtual machine to service based on the comparing.

14. The method of claim 8, wherein the source virtualization system environment hosts a first type of hypervisor that is different from a second type of hypervisor hosted by the target virtualization system environment.

15. A system for controlling virtual machine porting activity based on dynamically-calculated virtual machine predicate values, the system comprising:

a storage medium having stored thereon a sequence of instructions; and a processor that executes the sequence of instructions to cause the processor to perform acts comprising, receiving a command to move a subject virtual machine from a source virtualization system environment to a target virtualization system environment, wherein the source virtualization system environment and the target virtualization system environment are different;

accessing one or more match expressions that describe time of day and resource predicate conditions under which porting operations of the subject virtual machine are carried out; and invoking a virtual machine move operation, based on observance of the time of day and resource predicate conditions of the one or more match expressions.

16. The system of claim 15, further comprising instructions which, when stored in memory and executed by the processor cause the processor to perform further acts of:

identifying a set of service level agreements;

evaluating one or more virtual machine predicate values in the match expressions of the set of service level agreements; and prior to invoking an I/O operation of the virtual machine porting activity, instead, temporarily suspending the virtual machine porting activity.

17. The system of claim 16, further comprising instructions which, when stored in memory and executed by the processor cause the processor to perform further acts of:

associating two or more bandwidth caps to respective virtual machines; and observing a lower one of the two or more bandwidth caps.

18. The system of claim 16, wherein evaluating the one or more virtual machine predicate values in the match expressions is carried out after invoking the virtual machine move operation.

19. The system of claim 16, further comprising instructions which, when stored in memory and executed by the processor cause the processor to perform further acts of, considering the set of service level agreements in a timeframe between I/O operations that constitute the virtual machine porting activity.

20. The system of claim 15, further comprising instructions which, when stored in memory and executed by the processor cause the processor to perform further acts of:

comparing an alternate virtual machine's priority to the subject virtual machine's priority; and choosing which virtual machine to service based on the comparing.

21. The system of claim 15, wherein the source virtualization system environment hosts a first type of hypervisor that is different from a second type of hypervisor hosted by the target virtualization system environment.

* * * * *